United States Patent [19]
Schultz

[11] Patent Number: 4,751,608
[45] Date of Patent: Jun. 14, 1988

[54] BULK DEGAUSSER

[75] Inventor: Robert A. Schultz, Chicago, Ill.

[73] Assignee: Data Security, Inc., Lincoln, Nebr.

[21] Appl. No.: 918,351

[22] Filed: Oct. 14, 1986

[51] Int. Cl.$^4$ .................. H01F 13/00; H01H 47/00
[52] U.S. Cl. .................................................. 361/151
[58] Field of Search .......................... 361/149, 151

[56] References Cited

U.S. PATENT DOCUMENTS 3,023,280 2/1962 Tronslin et al. .................. 361/151
3,938,011 2/1976 Littwin .............................. 361/151

OTHER PUBLICATIONS

"Taberaser 1500" Ad, Taber Manufacturing & Engineering Company.
"Taberaser 409" Ad, Taber Manufacturing & Engineering Company.
"KYBE/Weircliffe Bulk Tape Erasers/An Essential Part of Your Magnetic Tape Maintenance Program Ad, KYBE, Dennison KYBE Corporation.
*Design and Construction of a Prototype Bulk Degausser* (Draft Proposal), Prepared by IIT Research Institute, Mar. 1985.
"The Erasure of High Energy Tapes", by E. R. Burke and D. R. Sanders, IEEE Transactions on Magnetics, vol. MAG.-21, No. 5, Sep. 1985.
NSA/CSS Specification/Magnetic Tape Degausser, L14-4-A, Oct. 31, 1985.
The Garner 1200 & 1400 High-Energy Video Tape Erasers, Garner Industries, E-11-8-84.
Model 1400-Garner Professional Tape Degaussers Owner and Maintenance Manual, Unit 1400A, Ser. No. 851400A016, Garner Industries.
"Erasure of Signals on Magnetic Recording", William A. Manly, Jr., IEEE Transactions on Magnetics, vol. MAG-12, Nov. 1976.

*Primary Examiner*—L. T. Hix
*Assistant Examiner*—David Porterfield
*Attorney, Agent, or Firm*—Fitch, Even, Tabin & Flannery

[57] ABSTRACT

A bulk degausser for erasing a reel of high energy magnetic tape. The degausser includes a circuit for generating magnetic fields including a coil defining a window for passage of the reel of tape. The coil includes a first winding having relatively few turns and a second winding, inductively coupled to the first winding, having relatively many turns. The circuit also includes an ac power supply connected to the first winding and a dc power supply connected to the second winding. A resonance capacitor is interconnected with the second winding for substantially balancing the inductive reactance of the second winding at the frequency of the ac power supply. The circuit also includes an isolation relay, interconnecting the capacitor and the second winding with the dc power supply, for isolating the dc power supply when the first winding is energized by the ac power supply. Energization of the second winding by the dc power supply causes a tape in said window to undergo a dc magnetic field, and energization of the first winding by the ac power supply induces ac current in the second winding resulting in a reel in said window experiencing an ac magnetic field. A drive mechanism for translating and rotating the reel of high energy magnetic tape with respect to the coil, is also disclosed.

13 Claims, 7 Drawing Sheets

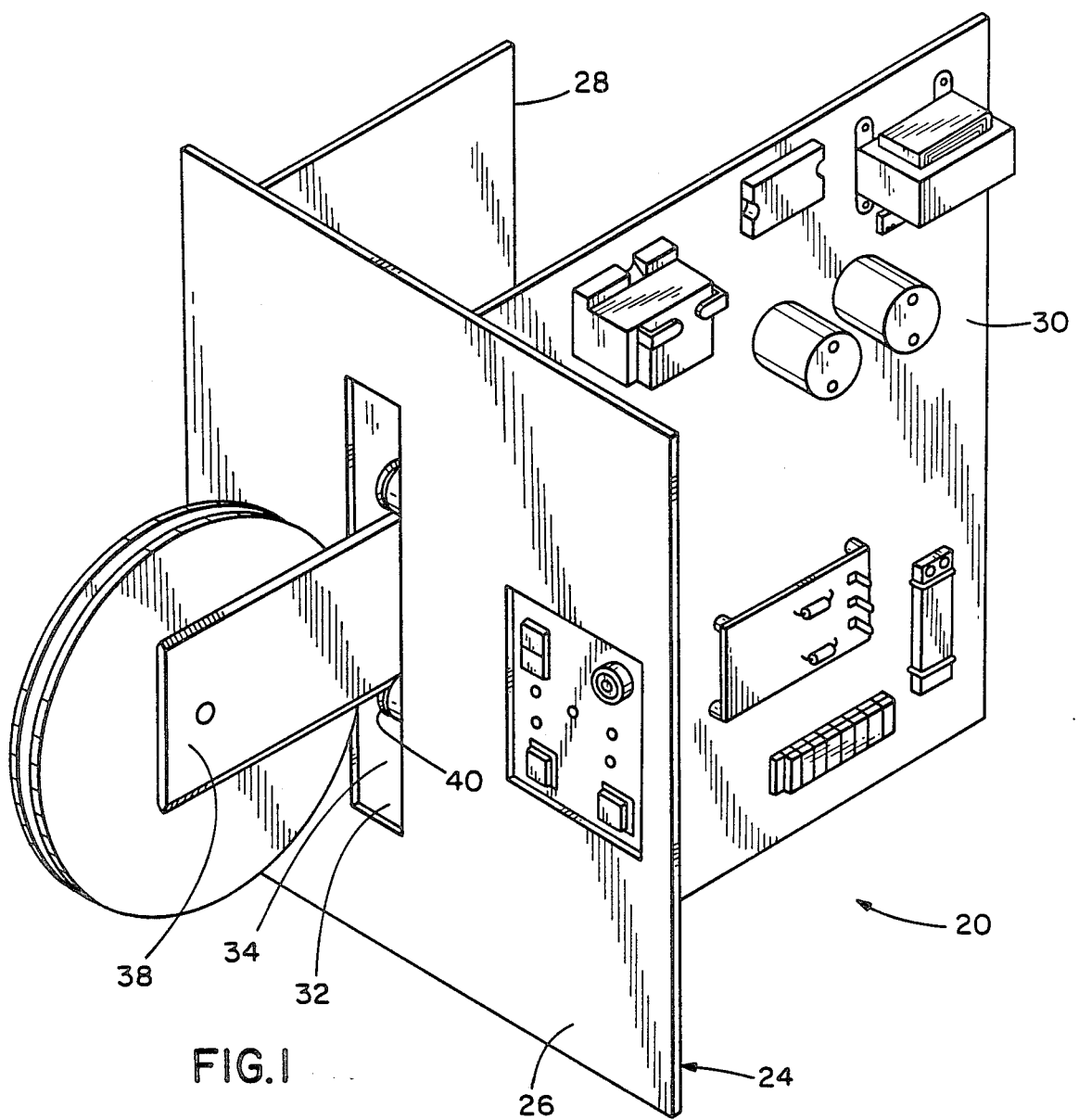
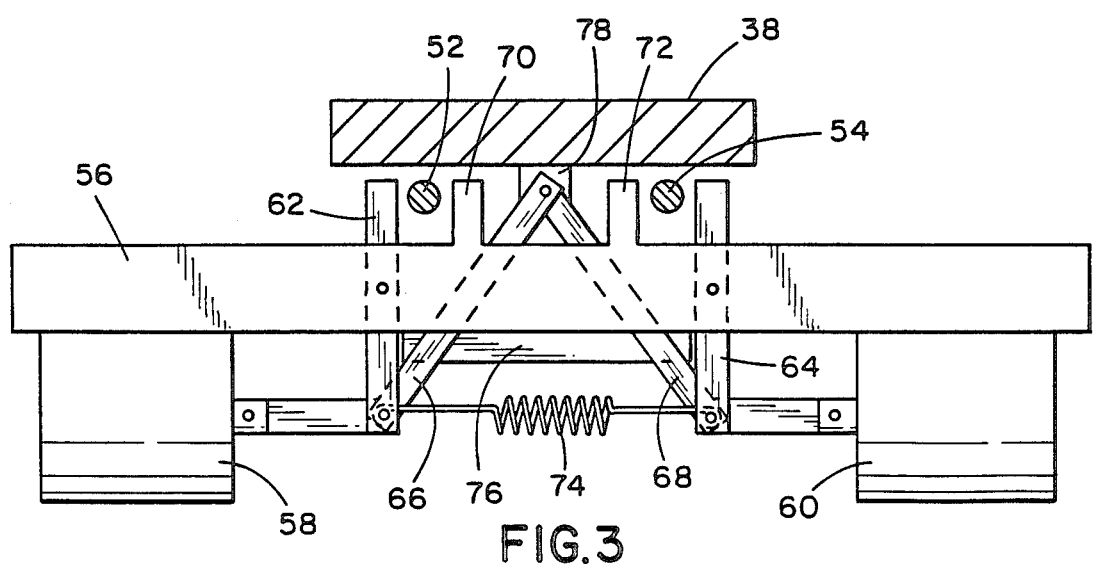

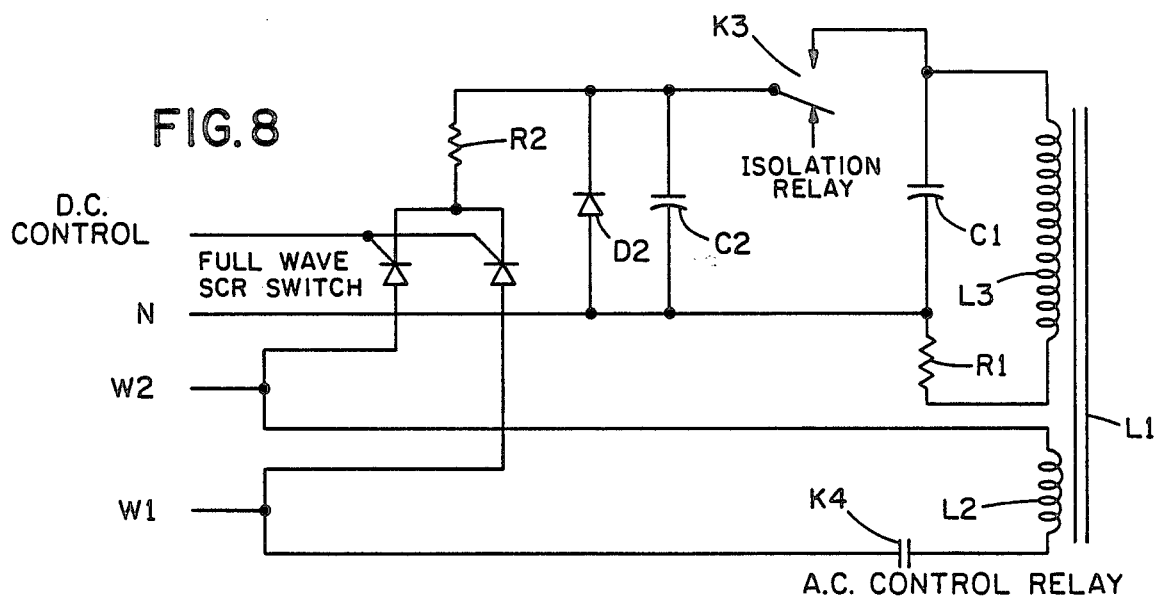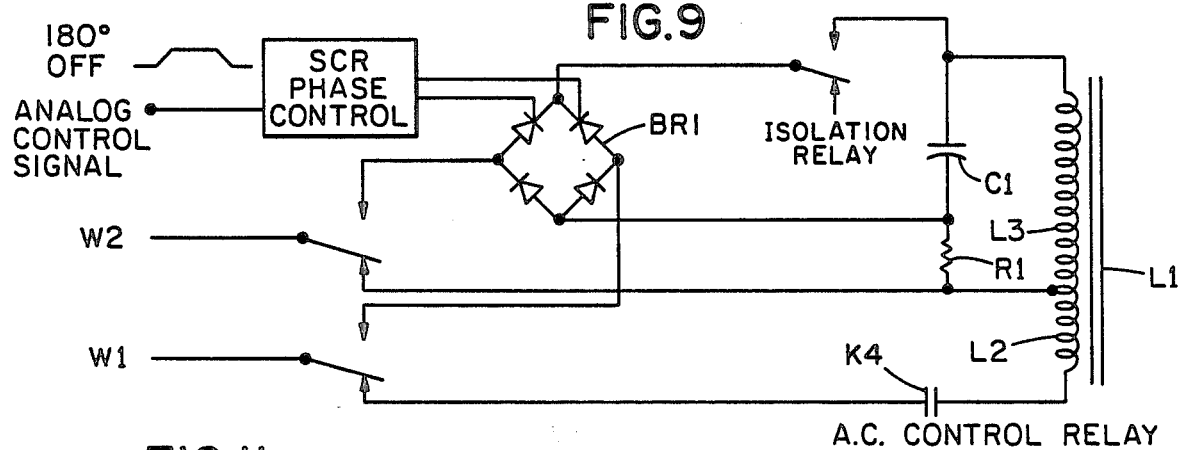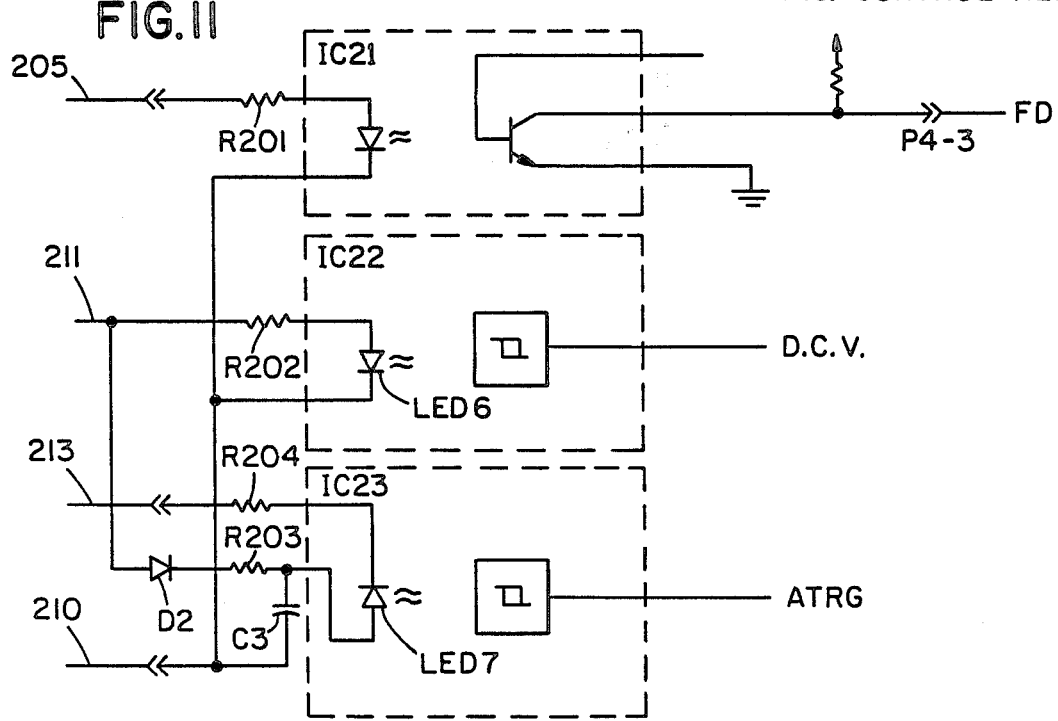

BULK DEGAUSSER

The present invention relates to apparatus for erasing magnetic tape and, more specifically, to a bulk degausser for erasing reels of high energy magnetic tape.

BACKGROUND OF THE INVENTION

High energy tape having coercivities up to about 750 oersteds, cannot be adequately erased with commercially available ac bulk degaussers so that there is a wide safety margin against attempts to recover the erased signals. Acceptable erasure for such a high energy tape has been accepted to mean that the residual level for the fundamental signal and all harmonics shall be a minimum of 90 dB below the saturated signal level.

Commercially available degaussers employ a coil to which is applied ac, resulting in the generation of a strong ac erase field. These devices may also slowly rotate the reel with respect to the field. It has been found that a 60 Hz, 5000 gauss erase field will only reduce a test signal on high energy tape by 70 dB, "Erasure of Signals on Magnetic Recording Media", Manly, T-MAG 76, Nov. pp. 758-760. This extent of erasure is insufficient to safely provide against recovery of the erased signals.

An erasing technique was developed in which a strong dc magnetic field was first applied to the tape, followed by application of an ac field. Based on this technique, it was proposed to construct a bulk degausser with a 100 dB erasure capability and a continuous duty operation to automatically erase a number of reels of high energy tape. This proposed degausser provides for the application of a strong dc field in the longitudinal orientation followed by moderate ac fields including longitudinal, perpendicular and transverse components. This degausser contemplated the use of a coil which is selectively excited by first a dc power supply and second by an ac power supply.

SUMMARY OF THE INVENTION

Among the various aspects and features of the present invention may be noted the provision of an improved bulk degausser. The bulk degausser of the present invention functions to erase reels of high energy magnetic tape and subjects the reels of tape to both a strong dc magnetic field and a moderate ac magnetic field. The degausser includes a single coil for generating the erase fields having a first winding for excitation by an ac power supply, and a second winding inductively coupled to the first winding for excitation by a dc power supply. The degausser also includes a drive mechanism, including a clutch/brake mechanism with few components, for rotating and translating the reel with respect to the coil. The bulk degausser of the present invention is reliable in use, has long service life, and is relatively easy and economical to manufacture. Other features and aspects of the present invention will be in part apparent and in part pointed out hereafter in the following specification and drawings.

Briefly, a bulk degausser of the present invention includes a frame, a coil held by the frame and defining a window for passage of a reel of high energy tape, a power supply for selectively providing ac power and selectively providing dc power, a drive mechanism for selectively translating and rotating the reel, and a control circuit for controlling operation of the power supply and the drive mechanism.

A circuit used in the degausser includes the coil which has a first winding having relatively few turns and a second winding which is inductively coupled to the first winding and has relatively many turns. The power supply includes an ac portion connected to the first winding and a dc portion connected to the second winding. A resonance capacitor is interconnected with the second winding for substantially balancing the inductive reactance of the second winding at the frequency of the ac power supply. Furthermore, isolation means is provided which interconnects the capacitor and the second winding with the dc power supply portion, for isolating the dc power supply when the first winding is energized by the ac power supply.

The drive mechanism includes an arm guided for reciprocal movement along a path extending through the window of the coil with the arm having a forward end and a rearward end. A hub holds the reel at the forward end of the arm while a motor is carried by the arm adjacent its rearward end. An endless belt or chain is driven by the motor and trained around the hub to rotate the hub. The belt or chain has two runs extending between the hub and the motor with the first run advancing toward the hub and the second run advancing toward the motor when the hub is driven. The drive mechanism further includes a support held by the frame and a drive carried by the support for selectively engaging one of the runs to move the reel with respect to the window.

BRIEF DESCRIPTION OF THE DRAWINGS

FIG. 1 is a perspective view of a bulk degausser for erasing magnetic tapes embodying various features of the present invention;

FIG. 3 is a rear elevational view, partly in schematic form, of the reel drive mechanism;

FIGS. 7-9 are schematic diagrams of alternative preferred embodiments of the power supply of the present invention using three-phase power, single-phase three-wire power, and single phase power with active transient control, respectively;

FIG. 11 is a schematic diagram of isolation circuitry for isolating the chassis components from the control circuitry.

Corresponding reference characters indicate corresponding components throughout the several views of the drawings.

DESCRIPTION OF THE PREFERRED EMBODIMENTS

Figure 2:
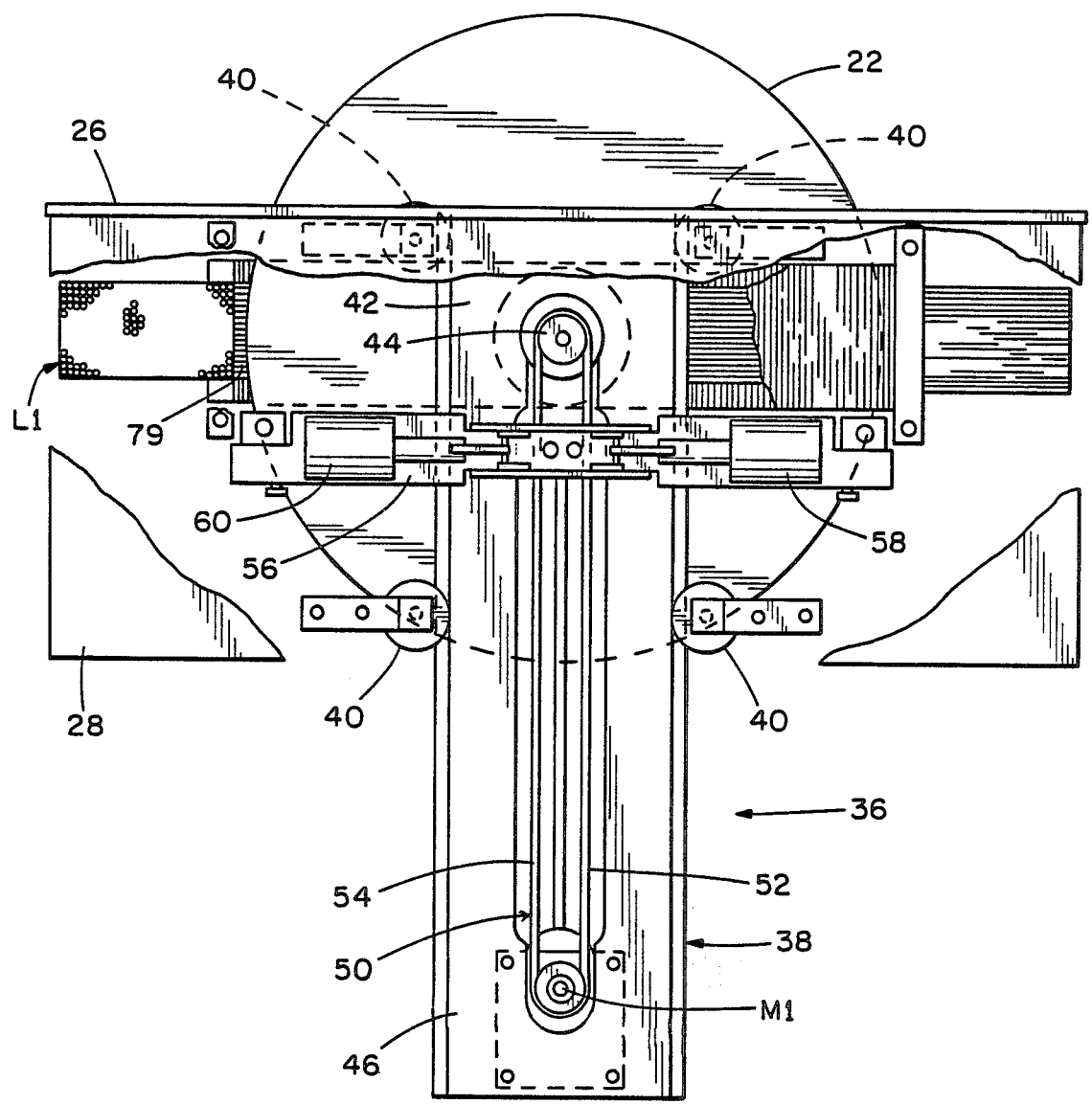
FIG. 2 is side elevational view of the bulk degausser of FIG. 1 with certain components removed to show a drive mechanism for rotating and translating a reel of tape with respect to a coil.

Referring now to the drawings, a bulk degausser of the present invention for erasing a reel 22 of high energy magnetic tape is generally indicated in FIG. 1 at reference character 20. The degausser includes a frame 24 including a front wall 26 and a pair of spaced side walls 28 and 30. The front wall has a rectangular aperture 32 and on its inside surface carries a coil L1 defining a window 34 disposed in alignment with the aperture 32 for passage of the reel 22 of magnetic tape. Side wall 28 supports a drive mechanism 36 (best shown in FIGS. 2 and 3) for mounting of the reel and rotating and translating the reel with respect to the coil. The drive mechanism includes an arm 38 guided for reciprocal movement through the window 34 by means of four rollers 40 attached to the side wall 28. Arm 38 is movable between an extended position for loading and unloading of the reel, shown in FIG. 1, and a retracted position wherein the center of the reel is inside the coil window, as shown in FIG. 2. Various power supplies, control circuitry and other electrical components are mounted on the remaining side wall 30. The coil L1 has a first winding L2 having relatively few turns for excitation by an ac power supply. Coil L1 also has a second winding L3 having relatively many turns and inductively coupled to winding L2 for excitation by a dc power supply. By electric energization of the windings in concert with translation and rotation of the reel with respect to the coil, the tape can be erased with over 90 dB signal reduction.

As shown in FIG. 2, the arm 38 has a forward end 42 rotatably carrying a hub 44 adapted for mounting and dismounting of the reel 22. The arm 38 also has a rearward end 46 disposed on which is a motor M1. An endless belt 50 is driven by the motor M1 and trained around the hub 44 to rotate the hub. Belt 50 has two substantially parallel runs 52 and 54 extending between the hub and the motor with the first run 52 advancing toward the hub when the hub is driven, and the second run 54 advancing toward the motor.

A support 56 fixed to the side wall 28 carries a pair of spaced solenoids 58 and 60, the plungers of which are pivotally attached to four links 62, 64, 66 and 68 of a clutch/brake drive mechanism. The mechanism is best shown schematically in FIG. 3 and includes the four links and a pair of fingers 70, 72 integral with the support 56 and extending toward the arm 38 with each of the fingers disposed adjacent to and inwardly of a corresponding run. The drive is generally symmetrical and further includes a spring 74 biasing the solenoid plungers to their extended positions and a stop 76 carried by the support 56 for limiting inward movement of the links.

More specifically, finger 70 is an insert finger and finger 72 is an extract finger. Insert link 62 has its midportion pivotally attached to the support 56, its outer end pinned to the plunger of solenoid 58 (along with the outer end of the brake link 66) and its inner end disposed adjacent to and outwardly of the first run 52 of the belt 50. Similarly, the extract link 64 has its midportion pivotally connected to the support 56, its outer end pinned to the plunger of solenoid 60 (along with the outer end of brake link 68), and its inner end disposed adjacent to, but outwardly of the second run 54 of the endless belt 50. The inner ends of brake links 66 and 68 are pivotally attached and carry a brake pad 78 for engaging the arm 38 between the runs 52 and 54. The drive mechanism includes an insert drive made up of the insert finger 70, the insert link 62, and the insert solenoid 58. Upon energization of the coil of solenoid 58, its plunger is retracted causing link 62 to swing toward the first run 52 and clamp it against the insert finger 70. This causes the arm rearward end 46 to move away from the coil L1 so that the reel 22 passes at least partially rearwardly through the window 34 of the coil.

The drive mechanism also includes an extract drive made up of the extract finger 72, the extract link 64 and the extract solenoid 60. Upon energization of the coil of solenoid 60, its plunger retracts causing the extract link 64 to swing against the second run 54 and clamp it against the extract finger 72. This causes the arm rearward end 46 to move toward the coil L1 so that the reel passes forwardly through the window 34 of the coil.

The drive mechanism further includes a brake formed by the brake links 66 and 68, the spring 74, and the brake pads 78. When the coils of the solenoids 58 and 60 are not energized, the coil compression spring 74 pulls the plungers to their extended positions which causes the links 66 and 68 to move together thereby causing the brake pad to move against the arm. This prevents translation of the arm with respect to the frame.

It is noted that both solenoids are never energized concurrently. The stop 76 prevents the link 62 or 64, which is not connected to the solenoid being energized, from moving inwardly. This keeps the brake pad out of contact with the arm when either solenoid is energized. Instead of the solenoid drive mechanism discussed above, a pair of translation actuator motors could be used for moving the reel with respect to the coil L1.

Figure 5:
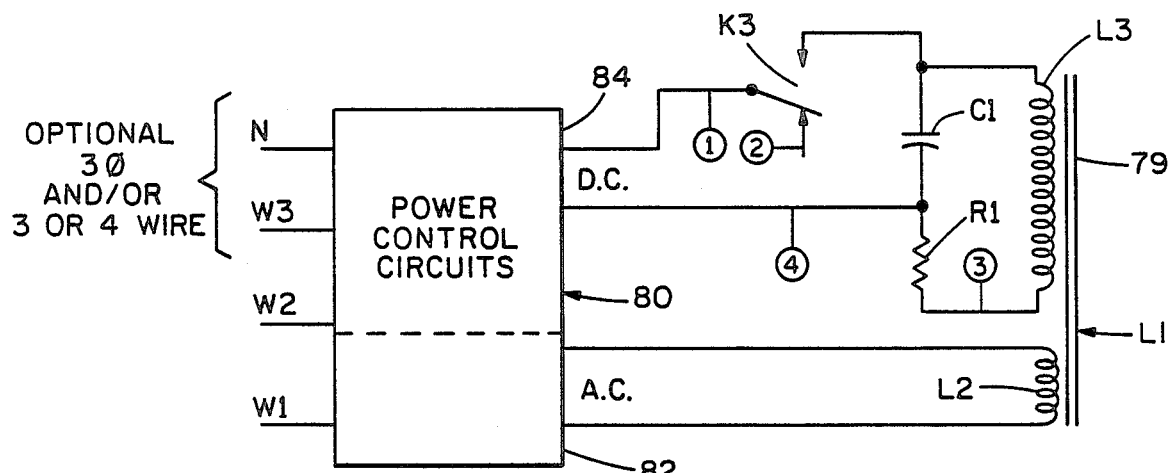
FIG. 5 is a diagram, partly block and partly schematic in nature, illustrating the ac and dc power control and the windings of the coil for excitation by the ac and dc, respectively.
Figure 6:
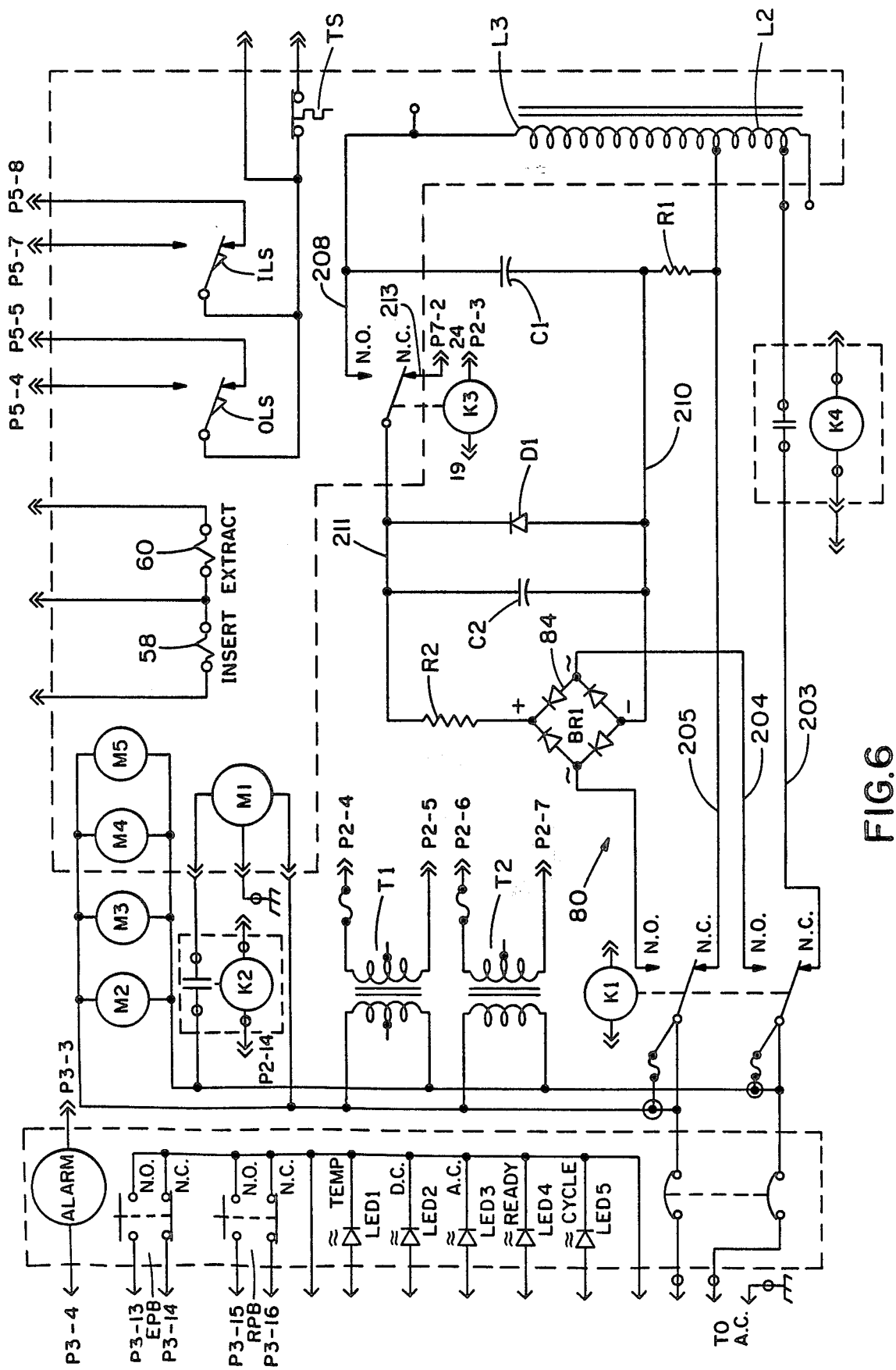
FIG. 6 is an electrical schematic diagram of the chassis components including the windings of the coil and the power supply circuitry.

Referring now to FIGS. 5 and 6, a circuit is shown for generating magnetic fields to erase the reel 22 of high energy tape. The circuit includes the coil L1 having winding L2 which may have about 60 turns for excitation by an ac power source and second winding L3 which may have about 1300 turns for excitation by a dc power source. Core laminations 79 are also provided to reduce stray fields and concentrate the generated flux with horizontal orientation in the window 34 of the coil. This orientation is longitudinal and transverse with respect to tape wound on a reel centered in a coil. It also provides a perpendicular field with respect to the tape when the reel is partially inserted in the coil. It is noted that a commercially available bulk degausser (Garner Industries Model 1400) has a main winding of about 60 turns, an auxially winding of approximately 1300 turns and core laminations; however, this bulk degausser only excites the coil with ac. This design also does not provide for automatic and continuous rotation of the reel within the coil. The coil and core lamination structure of this commercial degausser could be used in the bulk degausser of the present invention. However, circuit modifications would have to be made to provide excitation of the auxiliary winding by dc. The coil L1 could have separate windings as shown in FIG. 5, similar to an isolation transformer. Alternatively, as shown in FIG. 6, the coil L1 could have windings which share a common terminal similar to an autotransformer. Depending on line voltage, the peak ac field could have an intensity of about 2600 oersteds, while the dc field could have an intensity of about 4000–5000 oersteds.

As shown in FIG. 5, the circuit includes a power supply 80 including an ac power supply 82 for exciting the winding L2 and a dc power supply 84 for exciting the second winding L3. The input to the power supply 80 could be single phase 200-250 volt ac or three phase 208 volt ac with three or four wires. A capacitor C1 is interconnected with winding L3 so that the circuit including L3 and C1 will be in substantial resonance at the frequency of the ac power supply 82. Thus when the winding L2 is excited by the ac power supply, ac flow is induced through the resonant circuit so that a suitable ac magnetic field, with contribution from both windings, is generated with generally uniform flux density in the window 34 of the coil L1.

The auxiliary winding has about 1300 turns, an inductance of about 1.3 henries, and a resistance of about 15 ohms. With these values, a suitable ac field can be generated within the volume determined by the core construction 79 by selecting a value of C1 close to resonance determined by the formula:

$$C = 1/(\omega^2 L + R^2/4L)$$

where C is the capacitance of C1, $\omega$ is the frequency of the power supply, L is the inductance of L3, and R is the resistance of L3.

The second winding L3 is also used to generate a strong dc magnetic field. It has the advantage of producing many amp-turns with a low current. Furthermore, the resistance of this winding can limit the dc current to an effective value without the need for complicated devices or heavy, expensive transformers for voltage conversion and regulation in the power control circuits.

The turns ratio between the windings L2 and L3 results in a high voltage across winding L3 and capacitor C1, about 5000 volts. Conventional power control devices are not built to withstand this high level voltage. An isolation relay K3 having spdt contacts separates the resonant circuit of L3 and C1 from dc supply components during ac excitation of winding L3.

Concept verification has shown that 23,000 amp-turns are required for the design volume within L1 during dc excitation. This implies dc current of about 18 amperes. In practice, switching this large dc current through the inductance of L3 may cause premature failure of the isolation relay. It is preferable to control the dc current by switching the ac source to the dc power supply. Furthermore, the ac excitation windings must be isolated from the power source during dc operation, although the voltage and current constraints are not as severe as the auxiliary winding in this case. As shown in FIG. 6, this is accomplished using a transfer relay K1 having dpdt contacts in the power supply 80. The function of the transfer relay could also be accomplished using two relays (K1A, K1B) each having dpst contacts with the coils of the two relays connected in parallel. Additionally, electronic relays can be used instead of mechanical relays.

Resistor R1 is a low value shunt resistor placed to sense the field generating currents. The voltage between points 3 and 4 in FIG. 5 is proportional to these currents. This field monitoring is generally required by bulk degausser specifications to assure performance.

The voltages between points shown in FIG. 5 also can be exploited to monitor the status of the circuits and for protection and interlocking of the various isolating components. Stored energy at the normally closed contact at point 2 when the isolating relay opens can be sensed to trigger subsequent events such as ac excitation in the required operating cycle of the degausser. If the isolating relay contacts were to weld shut, triggering of the ac excitation by some other means could destroy components in the power control circuits and cause safety hazards. The voltage at point 1 should be zero during the ac field generation and can activate an interlock against other failure modes.

A preferred embodiment of the power supply 80 is shown in FIG. 6 wherein a single phase, 2-wire ac source is used. The normally closed position of the contacts of the transfer relay K1 connects winding L2 to the power source, however, the normally open contacts of an ac control relay K4 are positioned in series with the winding L2 to provide ac excitation of winding L2 during only the appropriate period of the operating cycle of degausser 20 which will be described hereinafter with reference to the timing diagram of FIG. 4.

The dc power supply 84 includes a full wave bridge rectifier BR1 connected to the normally open contacts of the transfer relay K1. An energy absorption capacitor C2 is connected across the series combination of the normally open contacts of the isolation relay K3 and the capacitor C1, for receiving energy from the winding L3. A diode D1 is positioned across the capacitor C2 to prevent reverse voltage during inductive kickback. A surge suppression resistor R2 is connected in series with the bridge rectifier and the capacitor C2.

The transfer relay K1 and the isolation relay K3 may be energized simultaneously to initiate the dc field, but the isolation relay is held closed after the transfer relay is opened at the end of the dc field period while C2 and D1 absorb the energy stored in the dc field of winding L3. Bridge rectifier BR1 converts the ac source current into dc current, and resistor R2 suppresses the current surge into C2 at the start of the dc field period to protect BR1. C2 and D1 absorb the energy stored in the winding L3 at the end of the dc period when the transfer relay K1 opens, which is about 350 joules for an inductance of 1.3 henries and a dc current of 20 amperes. If this energy were absorbed by C1, the transient voltage across C1 could exceed 10,000 volts and damage BR1. It could also cause electromagnetic interference.

Figure 7:
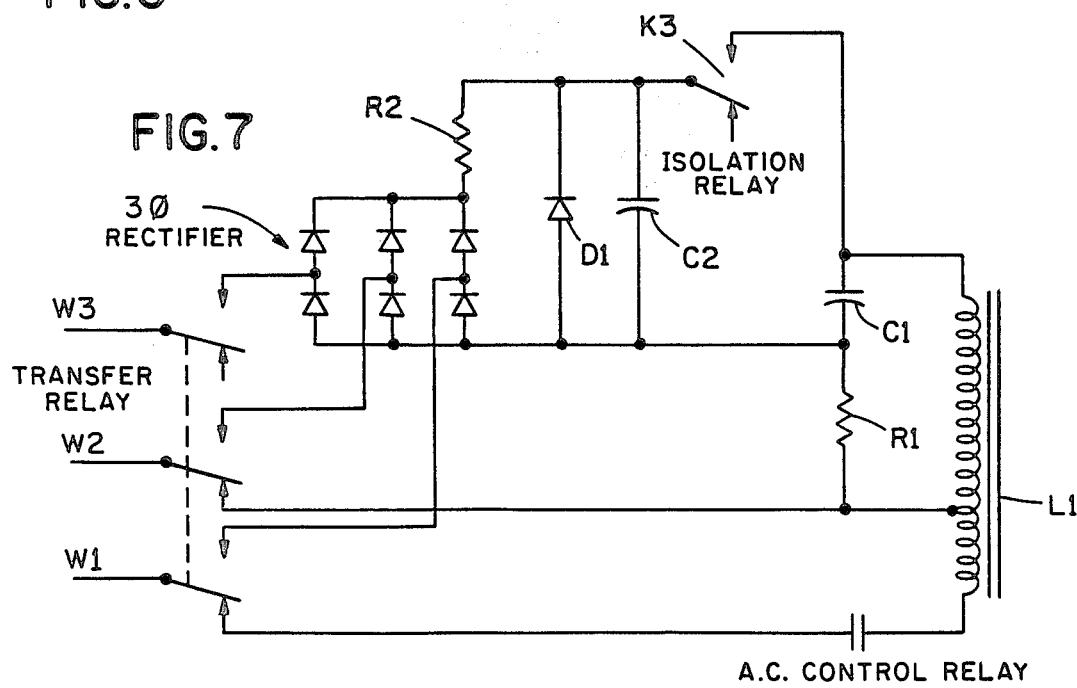

An alternative embodiment of the power supply 80 is shown in FIG. 7. The circuit of FIG. 7 is identical to that of FIG. 6 except that the power source, transfer relay, and rectifier are three-phase. One normally closed contact of the transfer relay is not connected. This circuit reduces the ac input current during the dc period of the operating cycle.

The alternative embodiment of the power supply shown in FIG. 8 adds a neutral conductor to the power source and replaces the bridge rectifier with a pair of silicon controlled rectifiers to switch and rectify the ac current into dc current. All mechanical switching devices except the isolating relay can be eliminated to improve reliability and reduce cost. However, without the transfer relay, the two windings of coil L1 must be electrically isolated from each other.

The alternative embodiment of the power supply shown in FIG. 9 is a single phase control circuit that eliminates the need for transient absorption by C2. Two silicon controlled rectifiers in the bridge rectifier are phase-controlled slowly to limit the initial current surge and the final voltage surge of the dc operating period. The phase control can also be limited to less than 180° maximum through feedback from the signal developed across resistor R to regulate the dc excitation current for the minimum effective value over a range of ac source voltages. This active control and regulation of the dc current can also be implemented with a three-phase rectifier containing phase-controlled silicon rectifiers.

Figure 10:
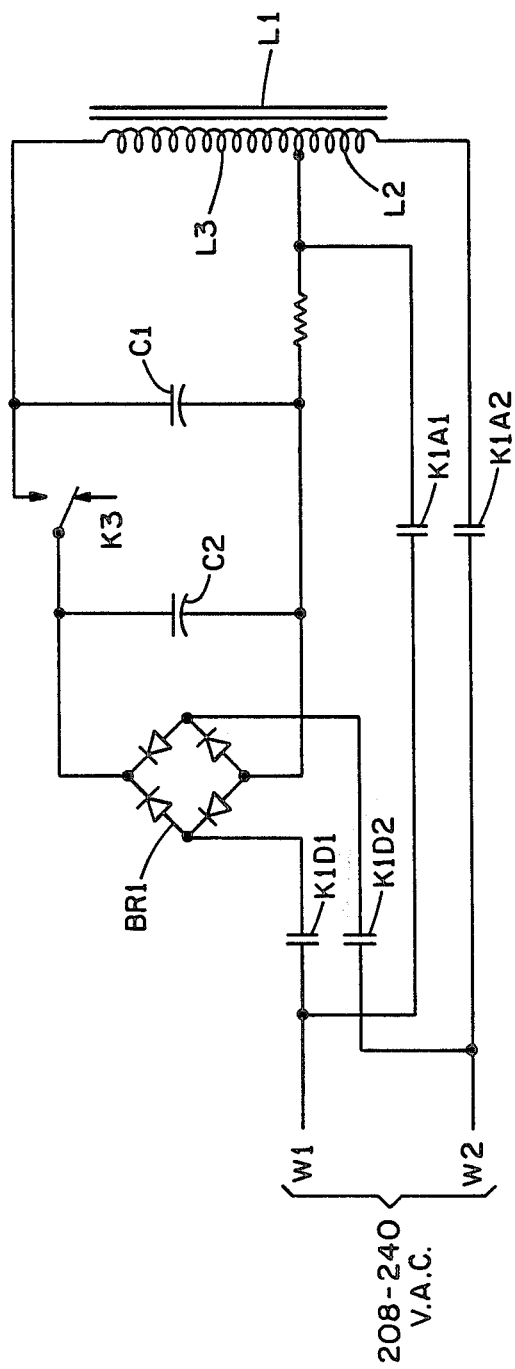
FIG. 10 is a schematic diagram of another alternative preferred embodiment of the power supply of the present invention, employing a pair of electronic relays to control energization of the windings of the coil.

The alternative of the power supply shown in FIG. 10 is similar to that shown in FIG. 6 except that the transfer relay K1 is replaced by two pairs electronic relays K1A and K1D. The relay pair K1A has two pairs of spst contacts K1A1, K1A2 connected in series with the coil L2 to control its energization by ac. The relay pair K1D has two pairs of spst contacts K1D1, K1D2 connected in series with the bridge rectifier BR1 to control energization of the coil L3 by dc. As the relay pairs K1A and K1D can be operated independently, the ac control relay K4 is no longer needed.

Referring again to FIG. 6 which is a schematic diagram of chassis components, besides the power supply 80 for the windings L2 and L3, the chassis components include a step down transformer T1 interconnected with a bridge rectifier (not shown) for providing 24 volt dc power for operating the coils of relays and solenoids. A step-down transformer T2 is interconnected with another bridge rectifier (not shown) for providing 5 volt dc power to various control circuitry shown in block form in FIG. 12. A limit switch OLS has contacts which signal when the arm 38 reaches its extended or out position shown in FIG. 1, and a limit switch ILS has contacts which signal when the arm moves to its retracted or in position shown in FIG. 2. A relay K2 has its contacts positioned to control energization of the drive motor 48. A reset push button RPB and an erase push button EPB are provided as are LED1-LED5 for initiating and indicating various operating conditions of the degausser 20.

In the operation of the degausser, the coil of isolation relay K3 is deenergized after the coil of transfer relay K1 to permit capacitor C2 to absorb energy from the winding L3 thereby preventing inductive kickback. Referring to FIG. 11, a pair of Schmitt trigger optical couplers IC22 and IC23 are provided with IC22 functioning to sense a voltage on line 211 of the dc power supply (point 1 in FIG. 5) and IC23 and associated circuitry (including a diode D2 and a capacitor C3) functioning as an interlock for the ac power supply. When the dc power supply is off there should be no voltage on line 211. If there was a fault that closed the isolation relay K3 during the ac period, voltage from the ac power supply would be applied to the dc power supply, possibly resulting in a major failure. The IC22 senses voltage at line 211 and provides an output indicating the presence of a voltage on line 211.

With respect to the operation of the ac interlock optical coupler the IC23, during the time when the dc power supply is on, the diode D2 permits charging of the capacitor C3 from line 211 through a resistor R203. When the transfer relay K1 is deenergized, causing termination of the dc period, the diode D2 blocks the capacitor C3 from discharging through the dc power supply circuitry. However, when the isolation relay K3 opens, connecting line 211 and line 213, the capacitor C3 discharges through light emitting diode LED7 connected in series with a resistor R204 which results in IC23 providing its "ATRG" output signal indicating that the ac operating period can safely be started. It is noted that voltage remaining on capacitor C2 when isolation relay K3 opens is bled off through R204 and LED7 or a low value resistor connected in parallel with them.

The purpose of optical coupler IC21 is to provide a fault detection (FD) indication should current cease to flow through second winding L3. Any time current flows through winding L3 a voltage is developed across resistor R1, between conductors 205 and 210. This voltage is sensed by optical coupler IC21 to provide the FD indication. This FD signal can be combined logically with control signals which should be causing current flow through winding L3. An alarm can go off should the appropriate control signal be present but without current flow through the winding thus indicating the absence of the magnetic fields and warning of failure to erase the tape reel 22.

Figure 12:
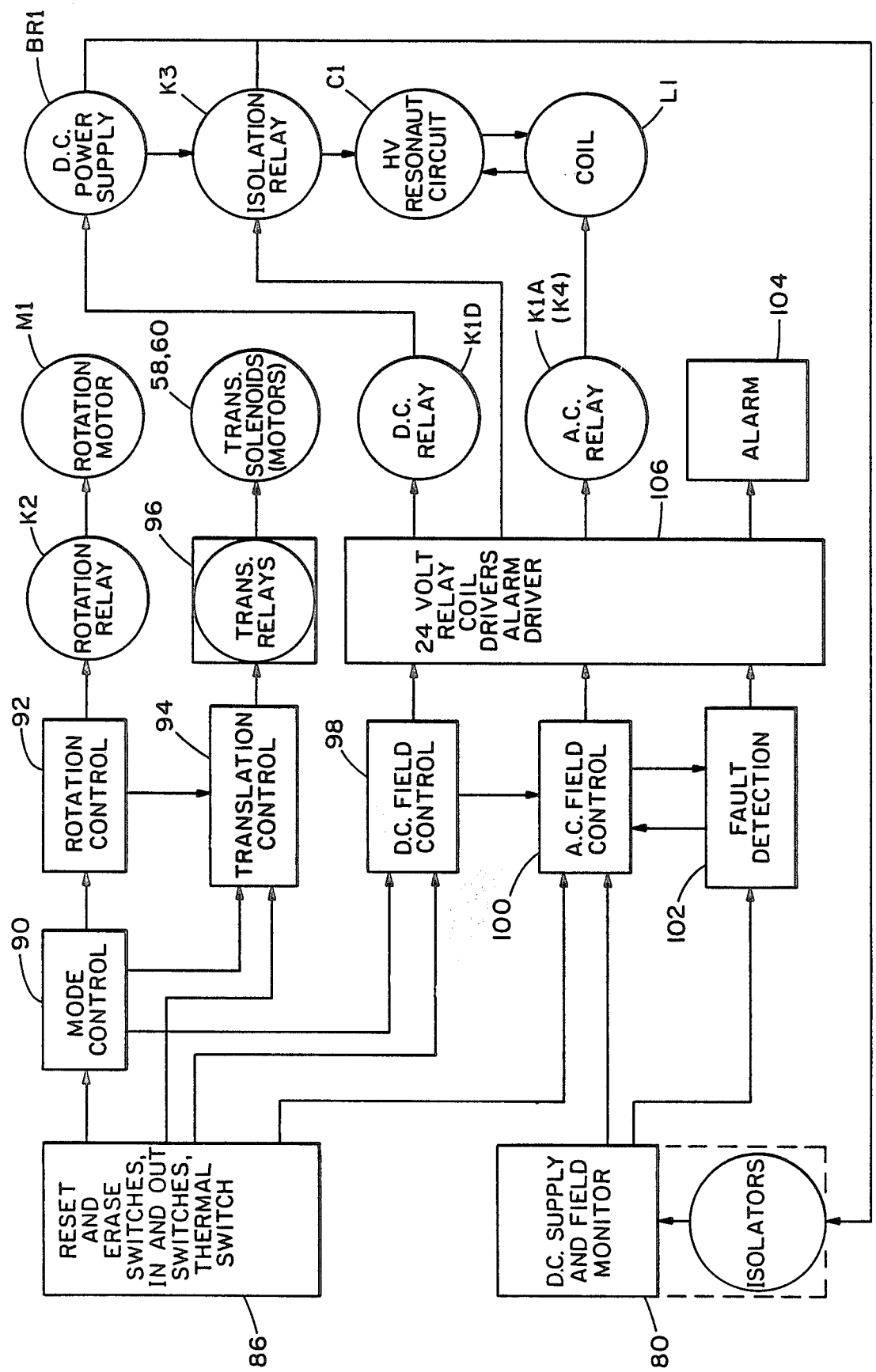
FIG. 12 is a block diagram illustrating various electrical and electronic components of the bulk degausser.

The various electrical and electronic components of the bulk degausser 20 are shown in block form in FIG. 12. It is noted that rectangles and connecting lines represent components at less than 30 volts while circles and connecting lines represent components subject to normal operating voltages in excess of 100 volts. The box 86 represents switches for controlling operation of control circuitry including an erase push button EPB, a reset push button RPB, a thermal switch TS which opens when the degausser exceeds a predetermined temperature level, the out limit switch OLS, and the in limit switch ILS, all shown in FIG. 6. The box 88 represents the dc supply and field monitor optical coupler circuits IC21, IC22 and I23.

A mode control 90 determines, based upon whether the reset push button has been activated or whether the erase push button has been activated, whether the degausser is in its reset mode or its erase mode. The rotation control 92 turns on the rotation motor M1 (48) by operating a rotation relay K2 in either of those modes until the limit switches OLS or ILS indicate movement is completed. The translation control 94 determines whether the reel 22 is to be moved in or out of the coil L1. The mode control 90 turns on the translation control while the limit switches OLS, ILS turn it off. The translation control 94 controls energization of the translation solenoid coils 58, 60 through translation relays or drivers 96. The dc field control 98 and ac field control 100 are responsive to the mode control and regulated by optical couplers to selectively control provision of the ac field and dc field. A fault detector 102 is responsive to the optical coupler IC21 and the ac field control 100 to provide indication to an alarm 104. Box 106 represents the 24 volt coil drivers and alarm driver needed to interface the controls 98, 100 and 102 with operating components. Note that FIG. 12 shows the transfer relay K1 formed by a pair of transfer relays K1A for controlling ac energization of coil L2, and K1D for controlling energization of BR1.

It will be appreciated that the control functions of the boxes 90, 92, 94, 98, 100, 102 and 106 can be implemented using discrete integrated circuits in an asynchronous arrangement. The control functions can also be easily achieved through the use of a microprocessor.

Figure 4:
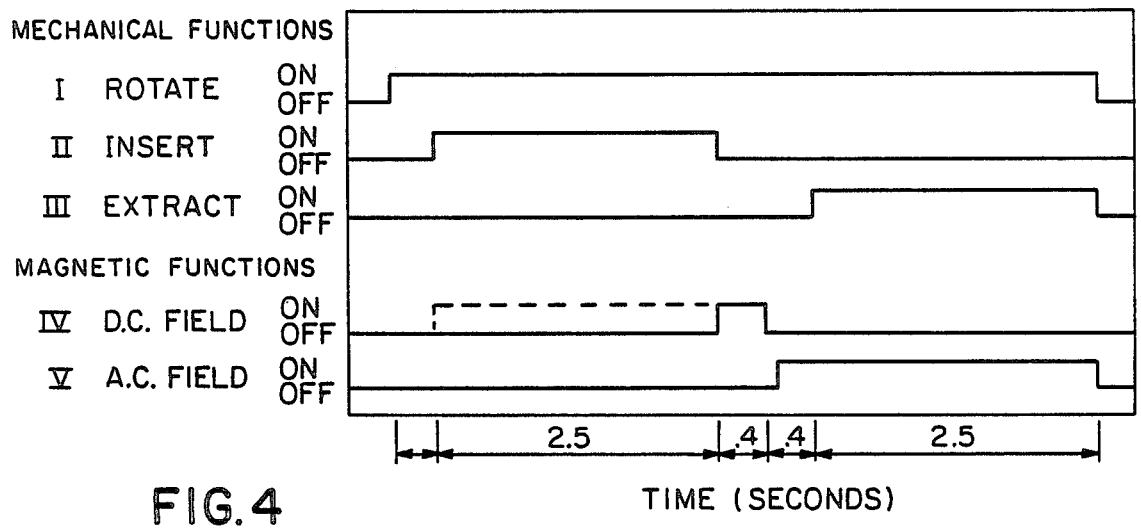
FIG. 4 is a timing diagram depicting intervals of tape rotation and translation with respect to intervals of ac and dc energization of the coil.

Referring now to the timing diagram of FIG. 4, the top trace I indicates the time during which the motor 48 rotates the reel of magnetic tape 22. The second trace II shows the time during which the insert solenoid 58 is actuated causing the reel to move from its position shown in FIG. 1 towards its position shown in FIG. 2. The middle trace III indicates the time during which the extract solenoid 60 is actuated which causes the reel to move from its position in FIG. 2 towards its position shown in FIG. 1. The trace IV indicates the time during which dc is caused to flow through the second winding L3 resulting in generation of the dc field. Finally, the lowest trace V shows the time during which the first winding L2 is excited by ac resulting in the ac magnetic field acting upon the reel 22.

With the arm 38 in its extended position shown in FIG. 1 and with the reel 22 mounted on the hub 44, the erase push button EPB can be actuated which causes the mode control 90 and the rotation control 92 to activate electronic rotation relay K2 to close its contacts to energize drive motor M1. After expiration of a delay to allow the drive motor M1 to come up to speed, the translation control 94 energizes the coil of the insert solenoid 58 resulting in the reel moving into the window 34 of coil L1. When the in limit switch ILS is actuated, indicating that the reel is in its position shown in FIG. 2, the dc field control 98 concurrently energizes the coils of transfer relay K1 and isolation relay K3 resulting in the application of dc to the second winding L3.

The mode control 90 provides a timing function to insure the reel 22 undergoes at least one-half of a rotation prior to the deenergization of the coil of transfer relay K1. As mentioned previously, the coil of relay K3 is not concurrently deenergized but remains energized until optical coupler IC22 indicates that the dc current through winding L3 is substantially reduced. At this time, the coil of isolation relay K3 is deenergized. The optical coupler IC23 detects the discharge of the capacitor C3 to confirm opening of the isolation relay K3.

The optical coupler IC23 provides the "ATRG" signal causing the ac field control 100 to energize the coil of relay K4 (or K1A) which provides ac to first winding L2 resulting in generation of the ac magnetic field. The mode control 90 also provides a timing function to initiate extraction only after the reel has undergone at least one-half of a rotation. When the out limit switch OLS is activated, the coil of relay K4 is deenergized resulting in disconnection of first winding L2 from the ac power supply and resulting in electronic relay K2 opening its contacts to deenergize drive motor M1.

In view of the above, it will be seen that the several objects of the invention are achieved and other advantageous results attained.

As various changes could be made in the above constructions without department from the scope of the invention, it is intended that all matter contained in the above description or shown in the accompanying drawings shall be interpreted as illustrative and not in a limiting sense.

I claim:

1. A drive mechanism for translating and rotating a reel of high energy magnetic tape, said mechanism being a part of a bulk degausser which erases said tape, said degausser including a frame holding a coil for generating magnetic fields, said coil defining a window for passage by said tape, said drive mechanism comprising:
    an arm guided for reciprocal movement along a path extending through said window, said arm having a forward end and a rearward end;
    a hub for holding said reel and rotatable carried adjacent said forward end;
    a motor carried by said arm adjacent said rearward end;
    an endless means driven by said motor and trained around said hub to rotate said hub, said endless means having two runs extending between said hub and said motor with the first run advancing toward said hub and the second run advancing toward said motor when said hub is driven;
    a support held by said frame; and
    a drive carried by said support for selectively engaging one of said runs to move said reel through said window.

2. A drive mechanism as set forth in claim 1 wherein said drive is an insert drive for selectively engaging said first run to cause said arm rearward end to move away from said coil so that said reel passes rearwardly through said window.

3. A drive mechanism as set forth in claim 2 further comprising an extract drive carried by said support for relatively engaging said second run to cause said arm rearward end to move toward said coil so that said reel passes forwardly through said window.

4. A drive mechanism as set forth in claim 1 further comprising a brake carried by said support for engaging said arm when said runs are not engaged to hold said arm from movement with respect to said coil.

5. A drive mechanism as set forth in claim 3 wherein said support has an insert finger extending toward said arm and disposed adjacent to and inwardly of said first run, said insert drive including an insert clutch link pivotally carried by said suppport, said link having an inner end disposed adjacent to and outwardly of said first run and in alignment with said finger, said insert drive further including an insert solenoid with a plunger pivotally connected to the outer end of said link whereby energization of said solenoid retracts said plunger resulting in said first run being clamped between said insert finger and said insert clutch link.

6. A drive mechanism as set forth in claim 5 which is substantially symmetrical and further comprises an extract solenoid, an extract clutch link and a pair of brake links, the inner ends of which are pivotally connected and carry a brake pad for engaging said arm between said runs, the outer end of one brake link being pivotally connected to the outer end of said insert clutch link with the outer end of the other brake link being pivotally connected to the outer end of the extract clutch link, with both solenoids deenergized and their plungers extended said brake pad engaging said arm.

7. A drive mechanism as set forth in claim 6 further comprising spring means for biasing the plungers of said solenoids toward their extended position when said solenoids are deenergized.

8. A drive mechanism as set forth in claim 1 wherein said endless means is a belt.

9. A drive mechanism as set forth in claim 1 wherein said endless means is a chain.

10. A method of erasing a reel of high energy magnetic tape using a bulk degausser comprising:
    a frame;
    a coil held by said frame and defining a window for passage of said reel, said coil including a first winding having relatively few turns and a second winding inductively coupled to said first winding and having relatively many turns;
    power supply means for selectively providing ac power to said first winding and selectively providing dc power to said second winding;
    a drive mechanism for selectively translating said reel with respect to said coil, and selectively rotating said reel with respect to said coil; and
    means for controlling operation of said power supply means and drive mechanism, said method comprising the following steps:

(a) translating said reel from a first position wherein said reel is disposed substantially outside said window toward a second position wherein said reel is disposed substantially inside said window;

(b) rotating said reel and providing dc power to said second winding when said reel is in its second position; and (c) translating said reel from said second position toward said first position while rotating said reel and providing ac power to said first winding.

11. A method as set forth in claim 10 wherein in step (b) said reel undergoes at least one-half of a complete rotation while dc power is applied to said second winding.

12. A method as set forth in claim 10 wherein during step (a) said reel is rotated while said reel is translated from outside said window to inside said window and the provision of dc power to said second winding is not only during step (b) but also during step (a).

13. A method as set forth in claim 11 wherein step (b) also includes the substeps of (1) terminating the application of the dc power to said second winding after said reel undergoes at least one-half of a complete rotation and thereafter (2) providing ac power to said first winding for at least one-half rotation of said reel before said reel is moved from said window in step (c).

* * * * *